(12) United States Patent
Miro Bargallo et al.

(10) Patent No.: US 11,529,917 B2
(45) Date of Patent: Dec. 20, 2022

(54) SWITCH ARRANGEMENT AND METHOD FOR CONTROLLING A SWITCH ARRANGEMENT

(71) Applicant: Lear Corporation, Southfield, MI (US)

(72) Inventors: Marc Miro Bargallo, Valls (ES); Jose Gabriel Fernandez Banares, Valls (ES)

(73) Assignee: LEAR CORPORATION, Southfield, MI (US)

( * ) Notice: Subject to any disclaimer, the term of this patent is extended or adjusted under 35 U.S.C. 154(b) by 153 days.

(21) Appl. No.: 16/862,141

(22) Filed: Apr. 29, 2020

(65) Prior Publication Data

US 2021/0339692 A1 Nov. 4, 2021

(51) Int. Cl.
*B60R 16/033* (2006.01)
*H02J 9/06* (2006.01)
(Continued)

(52) U.S. Cl.
CPC ........ *B60R 16/033* (2013.01); *B60R 16/0232* (2013.01); *G05D 1/0088* (2013.01);
(Continued)

(58) Field of Classification Search
CPC .... B60L 1/006; B60L 1/14; B60L 1/16; B60L 3/0023; B60L 3/0046; B60L 3/0069;
(Continued)

(56) References Cited

U.S. PATENT DOCUMENTS 4,812,672 A 3/1989 Cowan et al.
5,006,816 A 4/1991 Koide
(Continued)

FOREIGN PATENT DOCUMENTS

CN 102355044 A 2/2012
CN 103227503 A 7/2013
(Continued)

OTHER PUBLICATIONS

WO2018087260A1, English Abstract and U.S. Equivalent U.S. Pub. No. 2020/0062200.
DE10201005549A1, English Abstract and Machine Translation.

*Primary Examiner* — Levi Gannon
(74) *Attorney, Agent, or Firm* — Brooks Kushman P.C.

(57) ABSTRACT

A switch arrangement for providing alternative distribution paths in a system for distributing electrical power in a vehicle including electrical power supplies and electrical loads. The switch arrangement includes a first switch configured to be connected to a first electrical element, a second switch configured to be connected to the first electrical element and a second electrical element, and a third switch configured to be connected to the second electrical element and a third electrical element. Each of the first, second, and third switches is independently controllable, and selective operation of each of the first, second, and third switches to its open or closed state interconnects at least two of the first, second, and third electrical elements to establish one of multiple alternative distribution paths to connect one of the power supplies and one of the loads or to connect two of the power supplies.

20 Claims, 11 Drawing Sheets

(51) Int. Cl.
  *B60R 16/023* (2006.01)
  *G05D 1/00* (2006.01)
  *H02J 7/00* (2006.01)
  *H02J 1/08* (2006.01)

(52) U.S. Cl.
  CPC ............ *H02J 1/086* (2020.01); *H02J 7/0024* (2013.01); *H02J 7/0031* (2013.01); *H02J 9/061* (2013.01); *H02J 9/068* (2020.01)

(58) Field of Classification Search
  CPC ........ B60L 3/0092; B60L 50/11; B60L 50/50; B60L 50/52; B60L 50/60; B60R 16/0232; B60R 16/03; B60R 16/0307; B60R 16/033; G05D 1/0055; G05D 1/0077; G05D 1/0088; H02H 7/22; H02H 7/222; H02H 7/262; H02H 7/268; H02H 7/28; H02J 1/084; H02J 7/0024; H02J 7/0029; H02J 7/00302; H02J 7/00304; H02J 7/00306; H02J 7/00308; H02J 7/0031; H02J 7/0036; H02J 9/061; H02J 2310/48; H02J 1/086; H02J 9/068; H03K 17/693; H03K 19/007; H03K 19/0075
  See application file for complete search history.

(56) References Cited

U.S. PATENT DOCUMENTS

| | | |
|---|---|---|
| 5,513,062 A | 4/1996 | Paul et al. |
| 6,084,382 A | 7/2000 | Hite |
| 6,747,369 B2 | 6/2004 | Griffith et al. |
| 6,995,993 B2 | 2/2006 | Sarlioglu et al. |
| 7,464,292 B2 | 12/2008 | Zansky et al. |
| 7,567,060 B1 | 7/2009 | Atcitty et al. |
| 9,855,856 B2 | 1/2018 | Patana |
| 10,407,003 B2 | 9/2019 | Hudson et al. |
| 11,117,532 B2 | 9/2021 | Fabregas et al. |
| 2011/0111268 A1 | 5/2011 | Weng et al. |
| 2013/0082639 A1* | 4/2013 | O'Kane ............... H02J 7/342 320/104 |
| 2013/0320986 A1 | 12/2013 | Shiraishi et al. |
| 2014/0368160 A1* | 12/2014 | Reichow ............... H02J 1/08 320/107 |
| 2016/0160828 A1* | 6/2016 | Betscher ............ F02N 11/0862 307/10.6 |
| 2017/0322258 A1 | 11/2017 | Miller et al. |
| 2019/0140225 A1* | 5/2019 | Inoue ..................... H01M 50/20 |
| 2019/0334375 A1 | 10/2019 | Wataru et al. |
| 2020/0001807 A1 | 1/2020 | Pighi et al. |
| 2020/0017042 A1 | 1/2020 | Boesch et al. |
| 2020/0018796 A1 | 1/2020 | Conell et al. |
| 2020/0062200 A1 | 2/2020 | Doernbach et al. |
| 2020/0070661 A1 | 3/2020 | Akuzawa |
| 2020/0216002 A1* | 7/2020 | Mazaki .................. H02J 7/1423 |
| 2020/0233441 A1* | 7/2020 | Morimoto ............ B60L 3/0092 |
| 2020/0339051 A1* | 10/2020 | Schill ..................... B60L 58/10 |
| 2020/0341037 A1 | 10/2020 | Serret et al. |
| 2021/0018564 A1 | 1/2021 | Takahashi |
| 2021/0041502 A1 | 2/2021 | Song |

FOREIGN PATENT DOCUMENTS

| | | |
|---|---|---|
| CN | 203069693 U | 7/2013 |
| CN | 104535867 A | 4/2015 |
| CN | 205176650 U | 4/2016 |
| CN | 105572496 A | 5/2016 |
| CN | 205229323 U | 5/2016 |
| CN | 106026374 A | 10/2016 |
| CN | 106199436 A | 12/2016 |
| DE | 10201005549 A1 | 6/2012 |
| RU | 2335055 C1 | 9/2008 |
| WO | 2017113338 A1 | 7/2017 |
| WO | 2018087260 A1 | 5/2018 |

* cited by examiner

SWITCH ARRANGEMENT AND METHOD FOR CONTROLLING A SWITCH ARRANGEMENT

TECHNICAL FIELD

The following relates to a switch arrangement and a method for controlling a switch arrangement for providing a plurality of alternative distribution paths in a system for distributing electrical power in a vehicle.

BACKGROUND

The automotive market is moving toward vehicles where human driving is strongly supported with automatic support systems. In that regard, such automatic support systems may provide partial driver assistance, such as an Automated Driver Assist System (ADAS). Such automatic support systems may alternatively provide for fully autonomous driving where human driving is not needed.

For this reason, electric architectures of such vehicles must be capable of working even in case of a failure (i.e., fail-safe operation). This can be achieved by adding redundant systems, but such redundancy can lead to increased costs.

Figure 1:
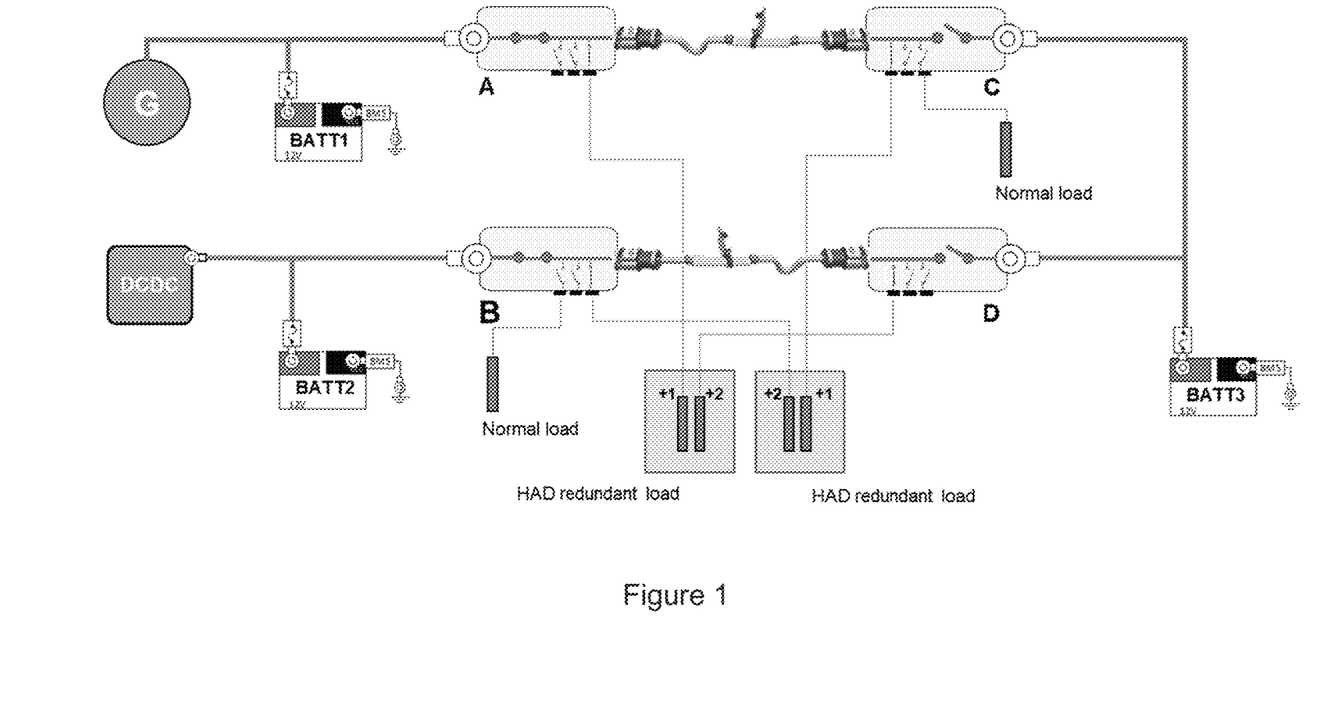
FIGS. 1 and 2 are simplified electrical schematics of an exemplary embodiment of an electrical distribution system for a vehicle.

In that regard, FIG. 1 is a simplified electrical schematic of an exemplary embodiment of an Electrical Distribution System (EDS) architecture for a vehicle. As seen therein, a power supply system includes switches A, B, C, and D configured to provide redundant connections to ensure double supply of electrical power from a generator (G), a DC-to-DC converter (DCDC), and/or batteries (BATT1, BATT2, BATT3) over distribution or transport lines or wires to high-autonomous-driving (HAD) redundant loads, for example those for vehicles having high levels of driving automation, such as Level 4 or Level 5 as defined by the Society of Automotive Engineers (SAE) in SAE J3016. Non-HAD redundant loads, i.e., Normal loads, may also be provided in switched connection with such electrical power supplies. In present day SAE Level 0 vehicles (i.e., no or low driving automation) there may be functions with all ranges of Automotive Safety Integrity Levels (ASIL) for functional safety, and there will be SAE Level 5 vehicles (i.e., fully autonomous) with functions also ranging all ASILs. The power supply system shown in FIG. 1 represents an optimized EDS architecture for high-autonomous-driving vehicles. The architecture is described in greater detail in co-pending U.S. patent application Ser. No. 16/393,527, entitled "Electrical Assembly and Method," filed on Apr. 24, 2019, now U.S. Pat. No. 11,117,532, the disclosure of which is hereby incorporated herein by reference in its entirety.

Figure 2:
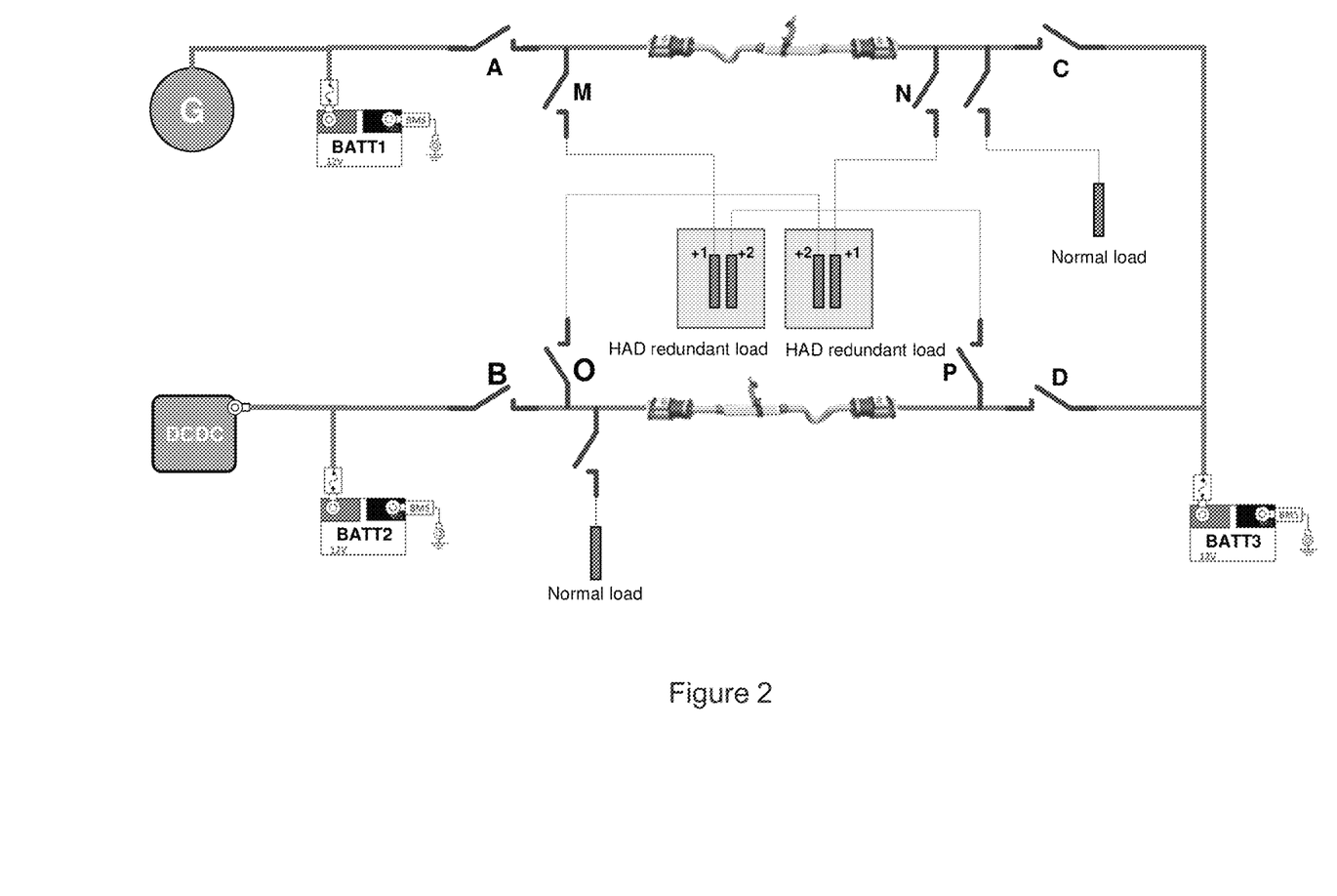

FIG. 2 is a simplified electrical schematic of the EDS architecture for high SAE Level (i.e., autonomous) vehicles of FIG. 1 including greater switch details. As seen therein, switches A, B, C, and D are again connected to electrical supplies including generator (G), DC-to-DC converter (DCDC), and batteries (BATT1, BATT2, BATT3). Switches M, N, O, and P are connected to HAD redundant loads. As is readily apparent, there are paths of supply where two switches (e.g., switch M and switch A) are in series. As a result, failure in a single switch could lead the supply path from an electrical supply to a HAD redundant load being cut. Indeed, switch M is in series with both switch A and switch C. Similarly, switch N is also in series with both switch A and switch C. Likewise, switch O is in series with both switch B and switch D, and switch P is also in series with both switch B and switch D.

The EDS architecture shown in FIGS. 1 and 2 thus provides optimized redundancy to energy supplies G, DCDC, BATT1, BATT2, and BATT3 utilizing the A, B, C, D switch layout shown therein. However, as previously described, a failure in any of switches M, N, O, or P shown in FIG. 2 will open a supply path. A need therefore exists for an improved electrical distribution system architecture having further redundancy to prevent open supply paths without unduly increasing costs.

SUMMARY

According to one non-limiting exemplary embodiment described herein, a switch arrangement is disclosed for providing a plurality of alternative distribution paths in a system for distributing electrical power in a vehicle including a plurality of electrical power supplies and a plurality of electrical loads. The switch arrangement comprises a first switch configured to be connected to a first electrical element, the first switch having an open state or a closed state, a second switch configured to be connected to the first electrical element and a second electrical element, the second switch having an open state or a closed state, and a third switch configured to be connected to the second electrical element and a third electrical element, the third switch having an open state or a closed state. Each of the first, second, and third switches is independently controllable, and selective operation of each of the first, second, and third switches to its open or closed state interconnects at least two of the first, second, and third electrical elements to establish one of the plurality of alternative distribution paths to connect one of the plurality of electrical power supplies and one of the plurality of electrical loads or to connect two of the plurality of electrical power supplies.

According to another non-limiting exemplary embodiment described herein, a method is disclosed for controlling a switch arrangement for providing a plurality of alternative distribution paths in a system for distributing electrical power in a vehicle including a plurality of electrical power supplies and a plurality of electrical loads, a first switch connected to a first electrical element, the first switch having an open state or a closed state, a second switch connected to the first electrical element and a second electrical element, the second switch having an open state or a closed state, and a third switch connected to the second electrical element and a third electrical element, the third switch having an open state or a closed state, wherein each of the first, second, and third switches is independently controllable. The method comprises selectively operating each of the first, second, and third switches to its open or closed state to interconnect at least two of the first, second, and third electrical elements to establish one of the plurality of alternative distribution paths to connect one of the plurality of electrical power supplies and one of the plurality of electrical loads or to connect two of the plurality of electrical power supplies.

According to another non-limiting exemplary embodiment described herein, a non-transitory computer readable storage medium is disclosed having stored computer executable instructions for controlling a switch arrangement for providing a plurality of alternative distribution paths in a system for distributing electrical power in a vehicle including a plurality of electrical power supplies and a plurality of electrical loads, the vehicle having a controller and a first switch connected to a first electrical element, the first switch having an open state or a closed state, a second switch connected to the first electrical element and a second electrical element, the second switch having an open state or a closed state, and a third switch connected to the second electrical element and a third electrical element, the third switch having an open state or a closed state, wherein each of the first, second, and third switches is independently controllable. The computer executable instructions are configured to cause the controller to selectively operate each of the first, second, and third switches to its open or closed state to interconnect at least two of the first, second, and third electrical elements to establish one of the plurality of alternative distribution paths to connect one of the plurality of electrical power supplies and one of the plurality of electrical loads or to connect two of the plurality of electrical power supplies.

A detailed description of these and other non-limiting exemplary embodiments of a switch arrangement and method for controlling a switch arrangement for providing a plurality of alternative distribution paths in a system for distributing electrical power in a vehicle is set forth below together with accompanying drawings.

DETAILED DESCRIPTION

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components, elements, features, items, members, parts, portions, or the like. Therefore, specific structural and functional details disclosed herein are not to be interpreted as limiting, but merely as a representative basis for teaching one skilled in the art.

With reference to the Figures, a more detailed description of non-limiting exemplary embodiments of a switch arrangement and method for controlling a switch arrangement for providing a plurality of alternative distribution paths in a system for distributing electrical power in a vehicle will be provided. For ease of illustration and to facilitate understanding only, like reference numerals may be used herein for like components and features throughout the drawings.

As previously described, the EDS architecture shown in FIGS. 1 and 2 provides optimized redundancy to energy supplies G, DCDC, BATT1, BATT2, and BATT3 utilizing the A, B, C, D switch layout shown therein. However, as also previously described, a failure in any of switches M, N, O, or P shown therein will open a supply path.

A possible solution to this problem would indicate to double each of the switches M, N, O and P shown in FIG. 2 (i.e., two switches connected in parallel) so as to make each switch redundant. Such a solution may also recommend similar doubling of switches A, B, C or D. However, such doubling of components increases associated costs.

A need therefore exists for an improved electrical distribution system architecture having further redundancy to prevent open supply paths without unduly increasing costs. In that regard, the present disclosure provides the alternative solution of adding a single switch to existing switch arrangements, wherein the switches may be combined in a delta (Δ) layout so that double redundancy is achieved with the addition of only a single component.

Figure 3:
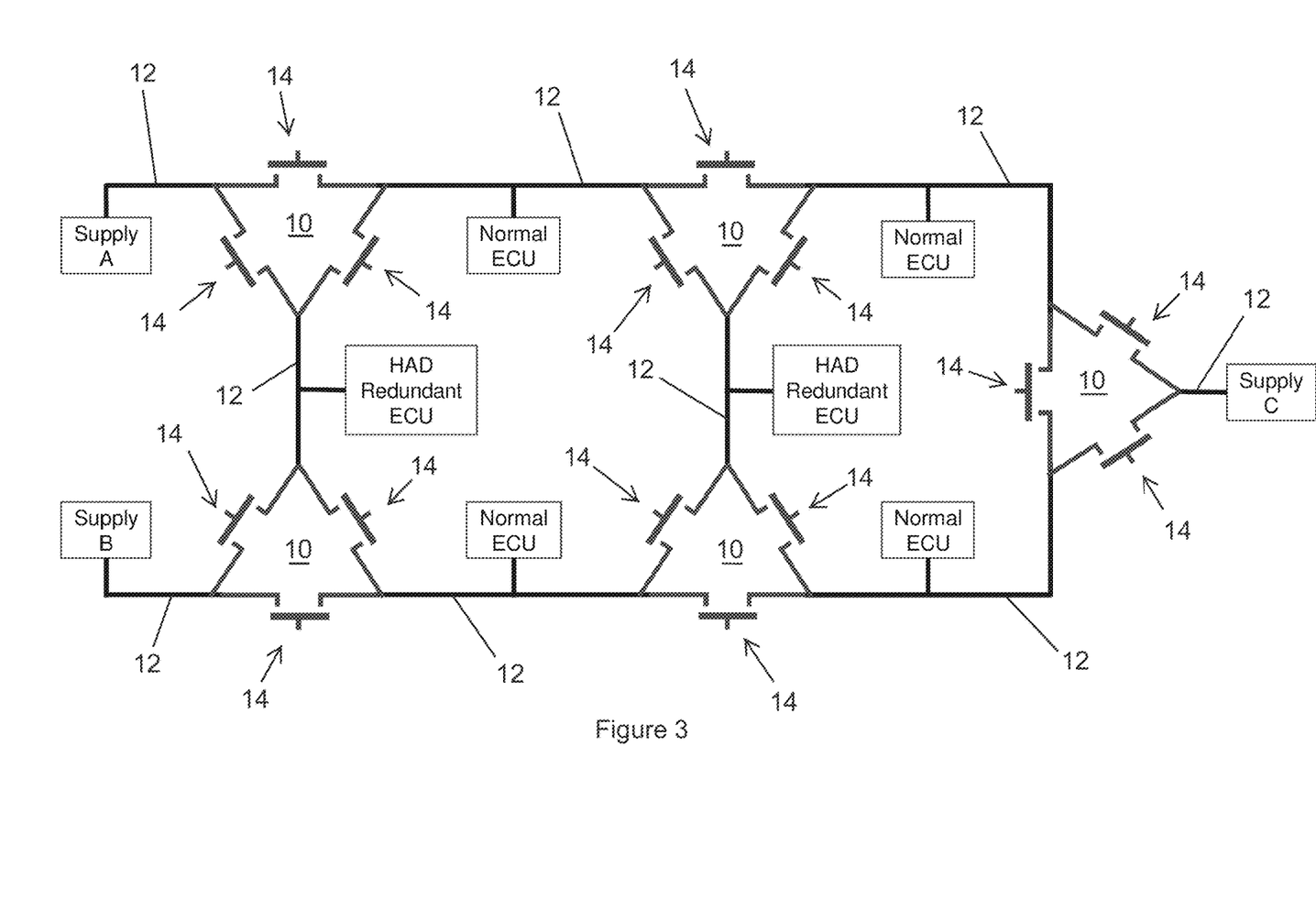
FIGS. 3-5 are simplified electrical schematics of exemplary embodiments of a vehicle electrical distribution system with exemplary embodiments of a switch arrangement for providing a plurality of alternative distribution paths in a system for distributing electrical power in a vehicle according to the present disclosure.

In that regard, FIG. 3 is a simplified electrical schematic of an exemplary embodiment of vehicle EDS with an exemplary embodiment of a switch arrangement for providing a plurality of alternative distribution paths in a system for distributing electrical power in a vehicle according to the present disclosure. As seen therein, there are several nodes in the vehicle EDS where a redundant delta or 3-point switch arrangement or architecture 10 according to the present disclosure may be applied. More specifically, such a switch arrangement 10 may be provided to interconnect electrical power Supplies A, B, and C over distribution or transport lines or wires 12 with HAD Redundant load Electronic Control Units (ECU) as well as Normal load (i.e., non-HAD load) ECUs.

As seen in FIG. 3, each switch arrangement 10 may comprise three switches 14 arranged in a delta configuration as shown. It should be noted that each individual switch 14 in a switch arrangement 10 may be of any type, such as a bi-stable relay, relay, transistor (including Field Effect Transistor (FET), smart FET, Bipolar Junction Transistor (BJT), Insulated Gate Bipolar Transistor (IGBT), Unijunction Transistor (UJT), Metal Oxide Semiconductor Field Effect Transistor (MOSFET), or any other type of transistor), or any other type. In case of an anomaly in any Supply A, B, or C, any switch 14, or any switch arrangement 10, there is always an alternative path that can be established over transport lines 12 to a HAD Redundant ECU, thereby ensuring supply redundancy. Moreover, in the event that a new and/or added current resulting from the establishment of such an alternative path is excessive for a given transport line 12, normal loads may also be disconnected. It should also be noted that, while FIG. 3 depicts three switches 14 arranged in a delta-configuration in each switch arrangement 10, which delta-configuration provides the benefits noted with the least number of switches 14, four or more switches 14 could alternatively be arranged in a rectangular or other configuration(s) in each switch arrangement 10 to provide similar benefits.

Figure 4:
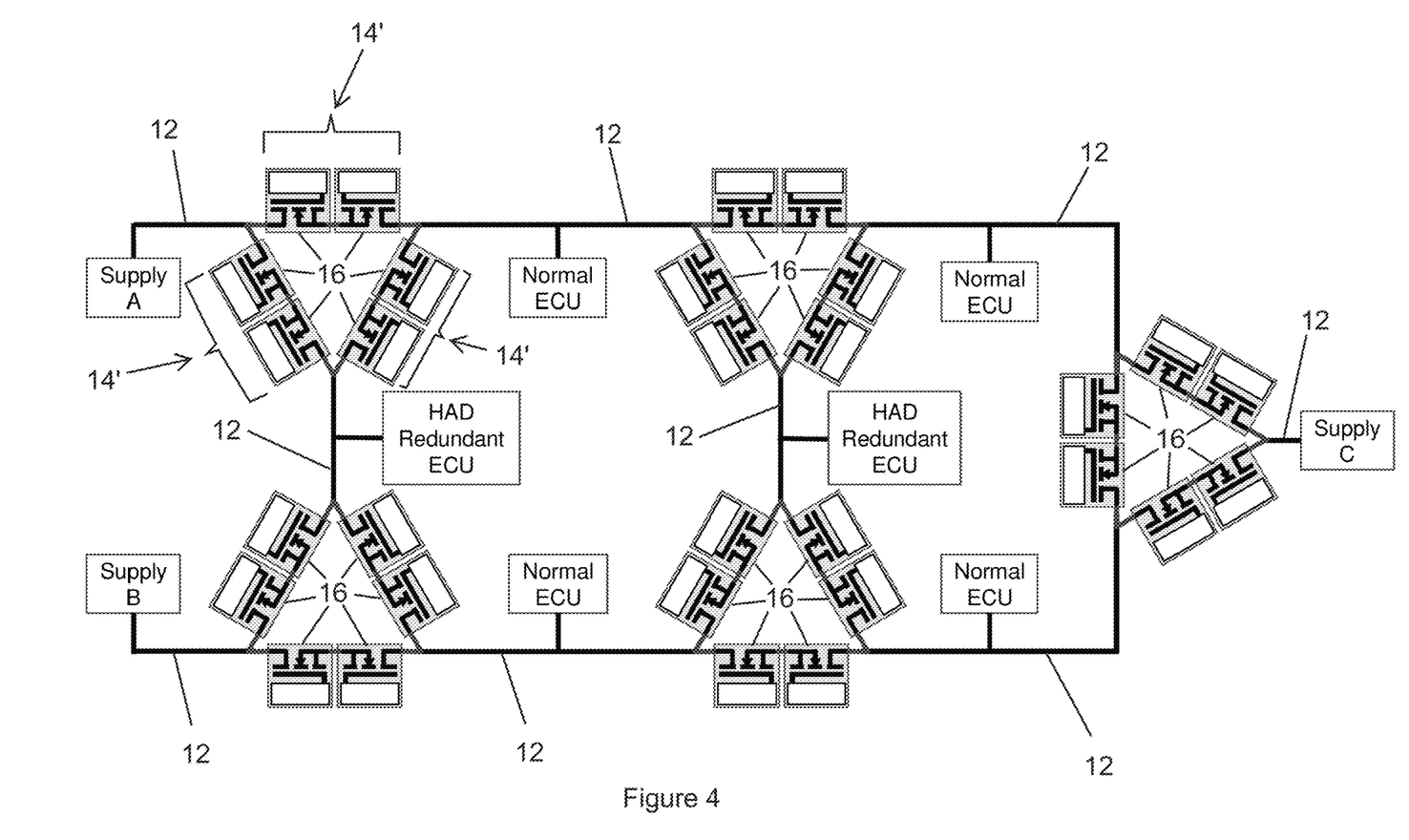

Using such switch arrangements 10, an energy distribution management system may be established to optimize switch parameters rating and prevent stress to any of these in case of a first failure, while keeping HAD redundant loads powered for full operation. For full power distribution diagnostics, current flow may be monitored together with main parameters for each switch 14, e.g., node voltages and component temperatures. In that regard, FIG. 4 is a simplified electrical schematic of an exemplary embodiment of a vehicle EDS with another exemplary embodiment of a switch arrangement for providing a plurality of alternative distribution paths in a system for distributing electrical power in a vehicle according to the present disclosure. As seen therein, a delta or 3-point switch architecture with current sensing is provided wherein, for further optimization, each of the switch arrangements 10 includes component switches 14' each comprising a pair of smart FETs 16 configured in a back-to-back (i.e., series) topology.

Such smart FETs 16 and back-to-back topology ensure not only proper bi-directional switching, but also the capabilities of accurate dual current flow monitoring and digital transmission, through the digital stages at each smart FET 16. They also eliminate the need for any additional current sensor and respective interfaces to adapt and transfer the data to a microcontroller. That is, if back-to-back smart FETs 16 are used as switches 14', bi-directional current may be measured, thereby avoiding the need for extra current sensing elements.

With current and voltage measurements, such 3-point bi-directional switches 14' thereby enable basic energy management, which is important for safety functions. More specifically, the delta-switch layout enables detailed information regarding current flow and any component damage, which may be used to understand the system energy flow after redundant current flow paths are activated. For example, this may enable disconnection of a secondary load to avoid a switch stress due to excessing current flow.

Figure 5:
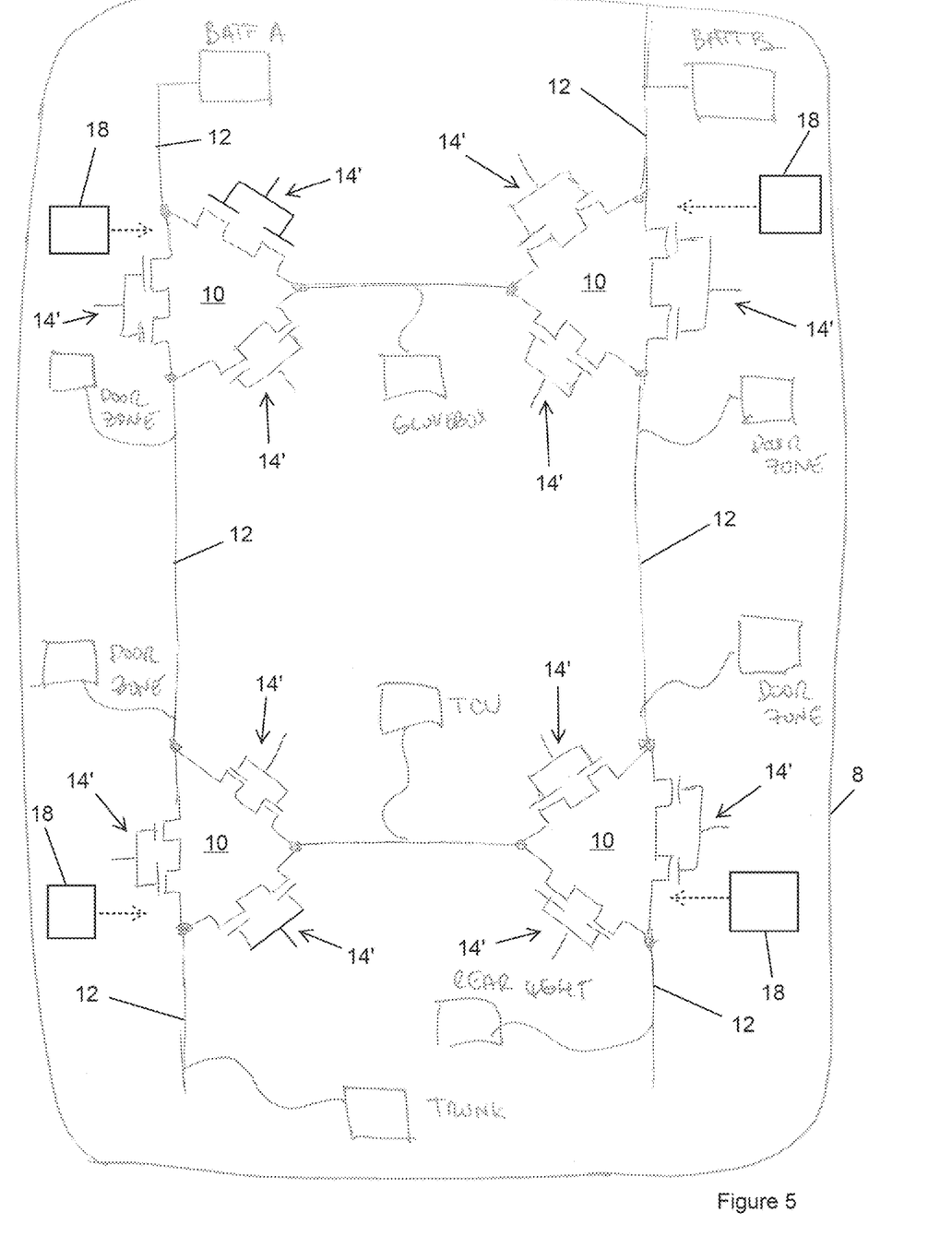

Referring next to FIG. 5, a simplified electrical schematic is shown of an exemplary embodiment of a vehicle EDS with an exemplary embodiment of a switch arrangement for providing a plurality of alternative distribution paths in a system for distributing electrical power in a vehicle 8 according to the present disclosure. As seen therein, delta or 3-point switch arrangements 10 may be provided to interconnect electrical power supplies, BATT A and BATT B, over distribution or transport lines or wires 12 with a transmission control unit (TCU), which may be a HAD redundant load, as well as DOOR ZONE loads, a GLOVEBOX load, a REAR LIGHT load, and a TRUNK load, which may be normal electrical loads (i.e., non-HAD redundant loads).

As also seen therein, each switch arrangement 10 may further comprise or be associated with a microcontroller, controller, or control unit 18 configured to control operation of the switch arrangement 10 including independent control of each switch 14' thereof to an ON or an OFF state. Alternatively, a single microcontroller, controller, or control unit 18 may be associated with and configured to control a plurality of switch arrangements 10. Moreover, a microcontroller, controller, or control unit, such as any microcontroller, controller, or control unit 18, may be provided as a central or master controller and configured to control and/or implement an energy distribution management system or control an electrical distribution system for a vehicle as described herein.

In that regard, it should be noted that any such microcontroller, controller, or control unit 18, and/or any other unit, module, controller, system, subsystem, mechanism, device, component or the like described herein may comprise appropriate circuitry, such as one or more appropriately programmed processors (e.g., one or more microprocessors including central processing units (CPU)) and associated memory, which may include stored operating system software and/or application software executable by the processor(s) for controlling operation thereof and for performing the particular algorithms represented by the various functions and/or operations described herein, including interaction between and/or cooperation with each other. One or more of such processors, as well as other circuitry and/or hardware, or several such processors and/or circuitry and/or hardware may also be distributed among several separate units, modules, controllers, systems, subsystems, mechanisms, devices, components or the like.

It should also again be noted that each individual switch (e.g., 16 as shown in FIG. 4) in each switch pair 14' of a switch arrangement 10 may be of any type, such as a bi-stable relay, relay, transistor (including Field Effect Transistor (FET), smart FET, Bipolar Junction Transistor (BJT), Insulated Gate Bipolar Transistor (IGBT), Unijunction Transistor (UJT), Metal Oxide Semiconductor Field Effect Transistor (MOSFET), or any other type of transistor), or any other type. In case of an anomaly in any supply, BATT A or BATT B, any switch 14', or any switch arrangement 10, there is always an alternative path that can be established over transport lines 12 to a DOOR ZONE load, the GLOVEBOX load, the REAR LIGHT load, the TRUNK load, and the TCU load, thereby ensuring supply redundancy. Moreover, in the event that a new and/or added current resulting from the establishment of such an alternative path is excessive for a given transport line 12, normal loads can also be disconnected.

Figure 6A:
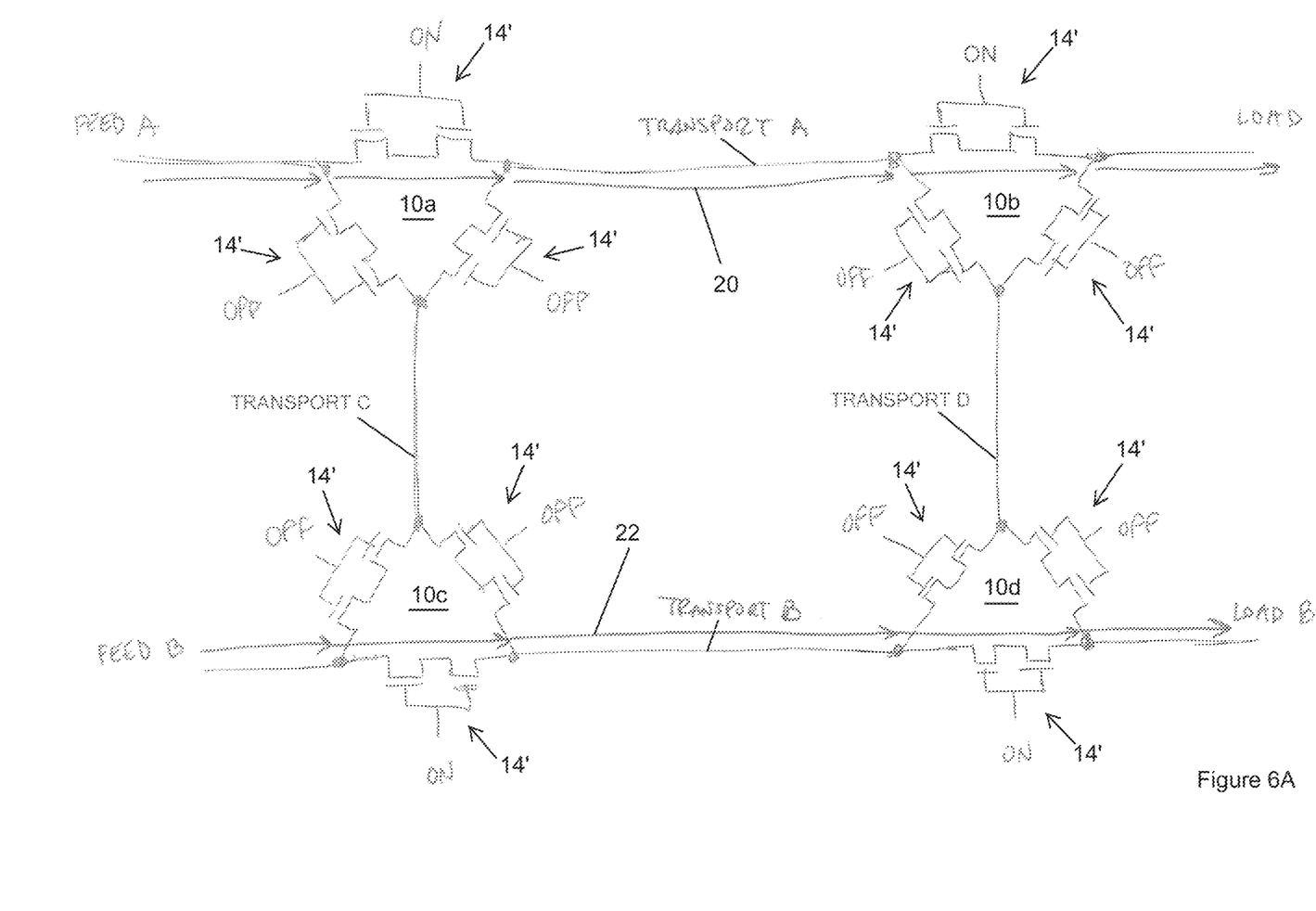
FIGS. 6A-6F are simplified electrical schematics of exemplary operations of an exemplary embodiment of an electrical distribution system with an exemplary embodiment of a switch arrangement for providing a plurality of alternative distribution paths in a system for distributing electrical power in a vehicle according to the present disclosure.

Referring now to FIG. 6A, a simplified electrical schematic is shown of an exemplary operation of an exemplary embodiment of a vehicle EDS with an exemplary embodiment of a switch arrangement for providing a plurality of alternative distribution paths in a system for distributing electrical power in a vehicle according to the present disclosure. In that regard, FIG. 6A depicts a vehicle EDS architecture similar to that of FIG. 5 during normal operation.

As seen in FIG. 6A, the switch arrangements 10a, 10b, 10c, and 10d may be controlled, adapted, configured, or reconfigured as shown to supply electrical power from FEED A to LOAD A and to supply electrical power from FEED B to LOAD B. More specifically, in each switch arrangement 10a and 10b, one switch 14' is turned ON and two switches 14' are turned OFF as shown to establish a path for current 20 from supply FEED A to line TRANSPORT A and LOAD A. Similarly, in each switch arrangement 10c and 10d, one switch 14' is turned ON and two switches 14' are turned OFF as shown to establish a path for current 22 from supply FEED B to line TRANSPORT B and LOAD B.

Figure 6B:
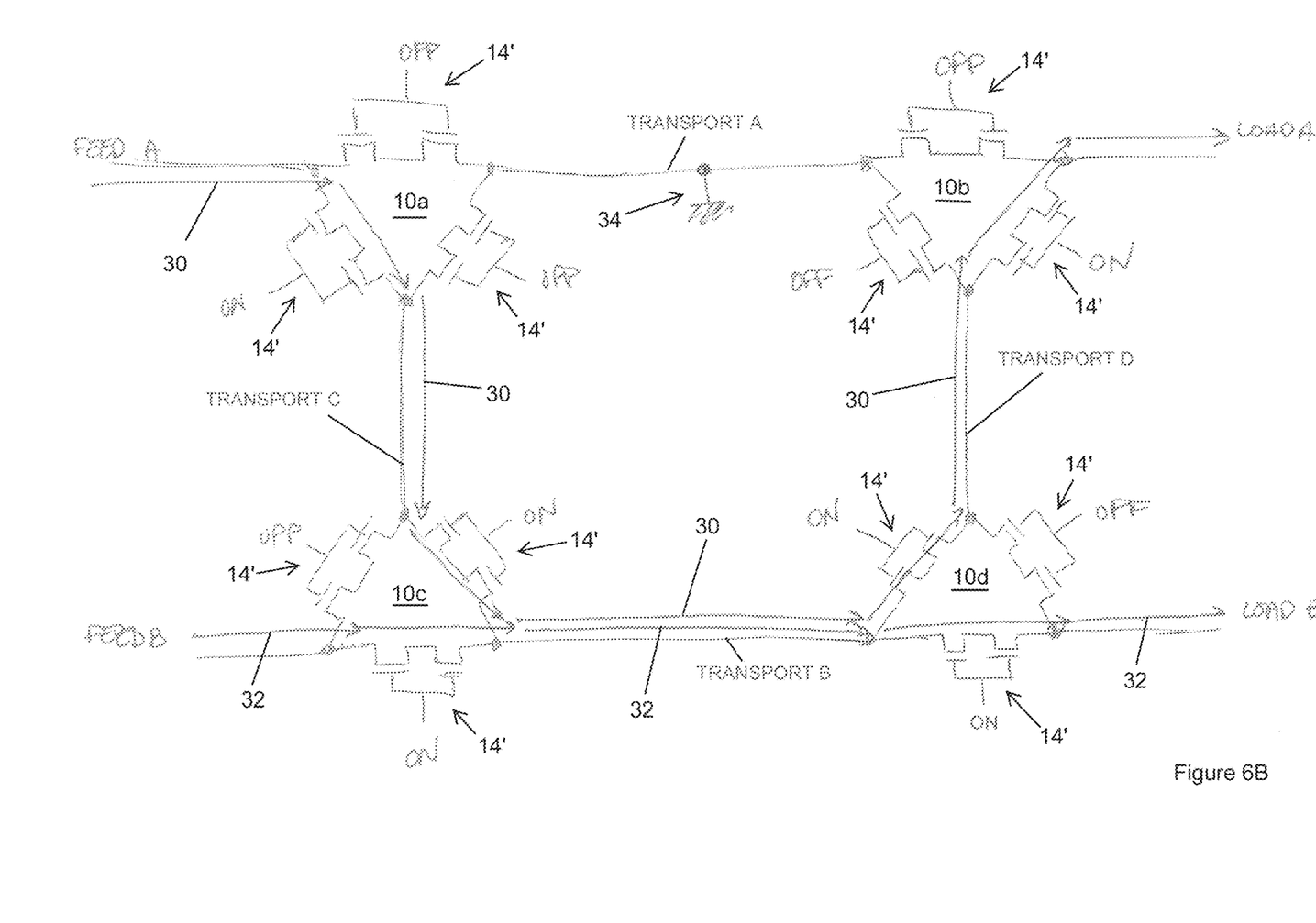

FIG. 6B is a simplified electrical schematic of another exemplary operation of an exemplary embodiment of a vehicle EDS with an exemplary embodiment of a switch arrangement for providing a plurality of alternative distribution paths in a system for distributing electrical power in a vehicle according to the present disclosure. As seen therein, a short-circuit 34 is shown in line TRANSPORT A. In such a situation, the switch arrangements 10a, 10b, 10c, 10d may be controlled, adapted, configured, or reconfigured as shown to keep supplying electrical power to LOAD A.

More specifically, in each switch arrangement 10a and 10b, two switches 14' are turned OFF and one switch 14' is turned ON as shown, while in each switch arrangement 10c and 10d, two switches 14' are turned ON and one switch 14' is turned OFF as shown. As a result, current 30 from FEED A is diverted around the short-circuit 34 in line TRANSPORT A for delivery to LOAD A over or along an alternative path. More specifically, current 30 from FEED A is routed by switch arrangement 10a to line TRANSPORT C, routed by switch arrangement 10c to line TRANSPORT B, and routed by switch arrangement 10d to line TRANSPORT D for delivery to LOAD A. At the same time, current 32 continues to be routed by switch arrangements 10c and 10d over line TRANSPORT B for delivery to LOAD B.

It should be noted that in such a situation, line TRANSPORT B carries an increased (e.g., double) current flow and may therefore be designed or over-dimensioned (for example for mechanical requirements) to withstand such an event. Any other transport wires or lines, including those connected to FEED A or FEED B, may likewise be designed to be capable of carrying an increased current flow in the event of various situations as may be described herein.

Figure 6C:
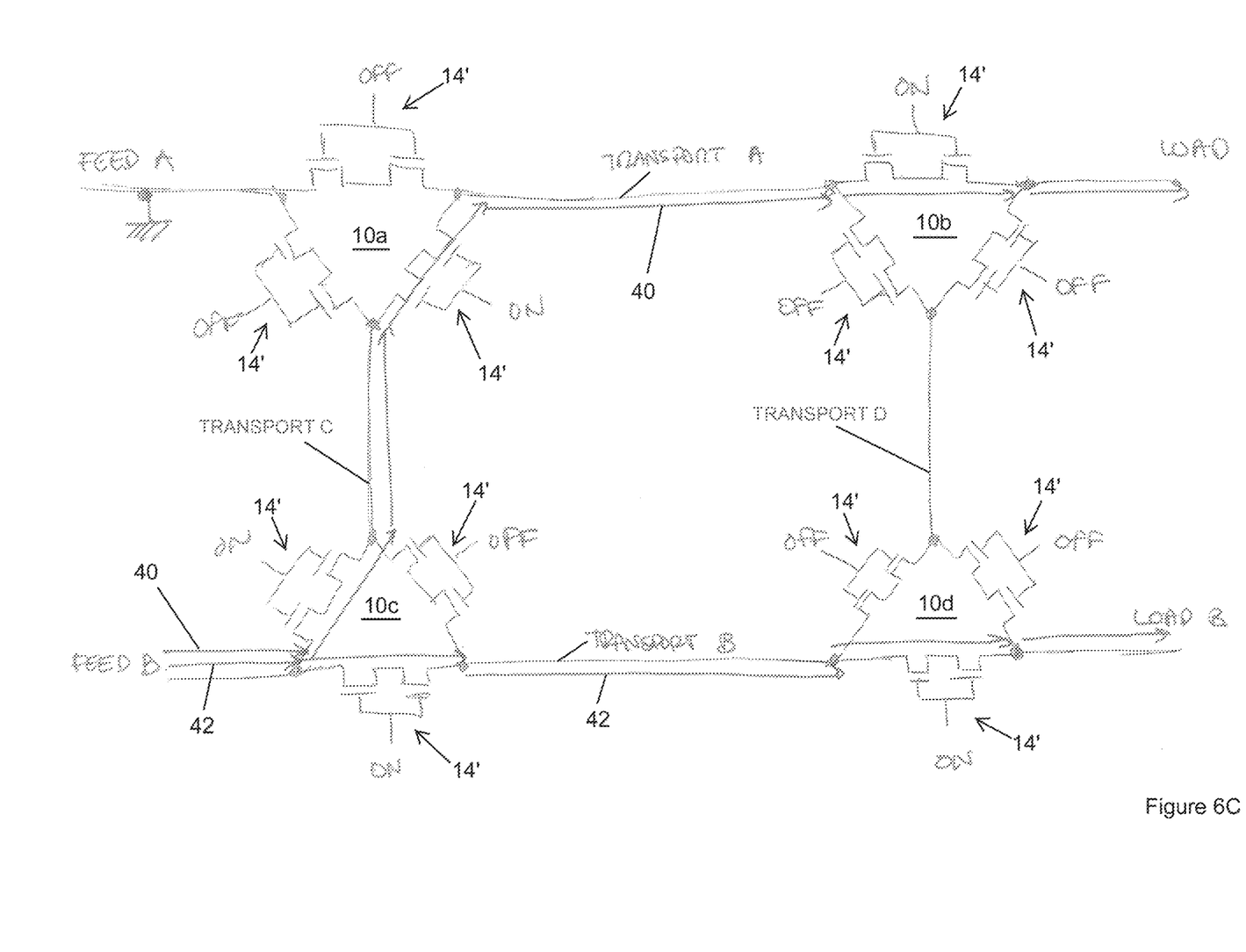

Referring next to FIG. 6C, a simplified electrical schematic is shown of another exemplary operation of an exemplary embodiment of a vehicle EDS with an exemplary embodiment of a switch arrangement for providing a plurality of alternative distribution paths in a system for distributing electrical power in a vehicle according to the present disclosure. In that regard, FIG. 6C depicts a failure in a source or supply component, in this case source FEED A. In such a situation, the switches 14' of switch arrangements 10a, 10b, 10c, and 10d may be controlled, adapted, configured or reconfigured as shown to provide energy to all loads, including LOAD A and LOAD B, from the other source or supply component, FEED B.

More specifically, in switch arrangement 10c, one switch 14' is turned OFF and two switches 14' are turned ON as shown to establish a path for current 40 from FEED B to TRANSPORT C and a path for current 42 from FEED B to TRANSPORT B. In switch arrangement 10d, two switches 14' are turned OFF and one switch 14' is turned ON as shown to establish a path for current 42 from TRANSPORT B to LOAD B. In switch arrangement 10a, two switches 14' are turned OFF as shown to isolate FEED A and one switch 14' is turned ON as shown to establish a path for current 40 from line TRANSPORT C to line TRANSPORT A. Finally, in switch arrangement 10b, two switches 14' are turned OFF and one switch 14' is turned ON as shown to establish a path for current 40 from line TRANSPORT A to LOAD A.

Figure 6D:
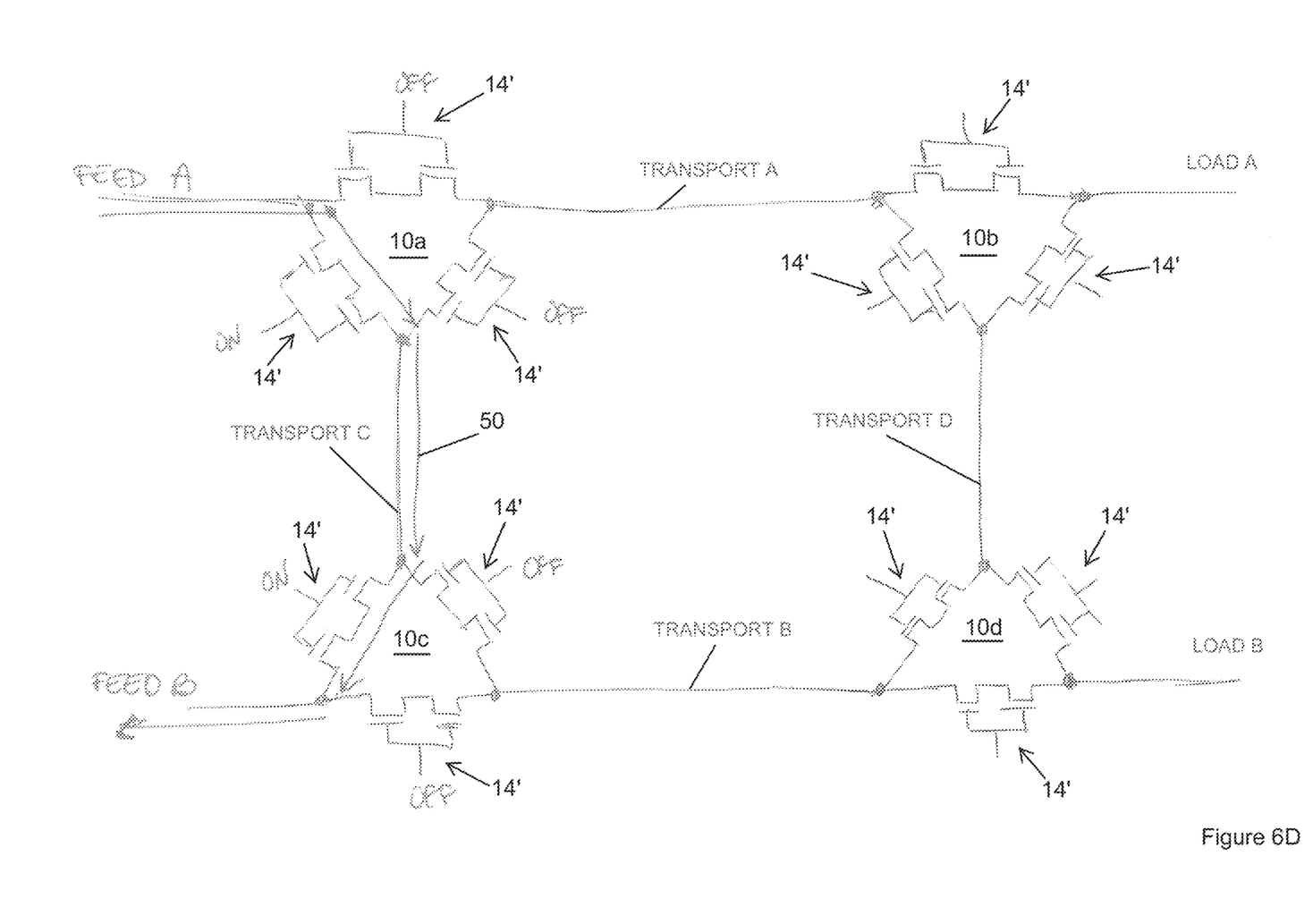

FIG. 6D is a simplified electrical schematic of another exemplary operation of an exemplary embodiment of a vehicle EDS with an exemplary embodiment of a switch arrangement for providing a plurality of alternative distribution paths in a system for distributing electrical power in a vehicle according to the present disclosure. In that regard, FIG. 6D depicts the case where source FEED A is used to charge source FEED B. As seen therein, the switch arrangements 10a and 10c may be controlled, adapted, configured, or reconfigured as shown to establish a path for current 50 from FEED A to FEED B.

More specifically, in switch arrangement 10a, two switches 14' are turned OFF and one switch 14' is turned ON as shown to establish a path for current 50 from FEED A to TRANSPORT C. In switch arrangement 10c, two switches 14' are turned OFF and one switch 14' is turned ON as shown to establish a path for current 50 from TRANSPORT C to FEED B. Such configurations of the switches 14' in switch arrangements 10a and 10c also isolate the remainder of the EDS, including LOAD A and LOAD B, while source FEED A charges FEED B (or vice versa), thereby maximizing energy flow (or equalization). Moreover, in the event of failure of one or both of the switches 14' in switch arrangements 10a and 10c that form the path shown, an alternative path could be established by turning ON the other two switches 14' (currently shown as turned OFF) in the respective switch arrangement 10a and/or 10c.

Figure 6E:
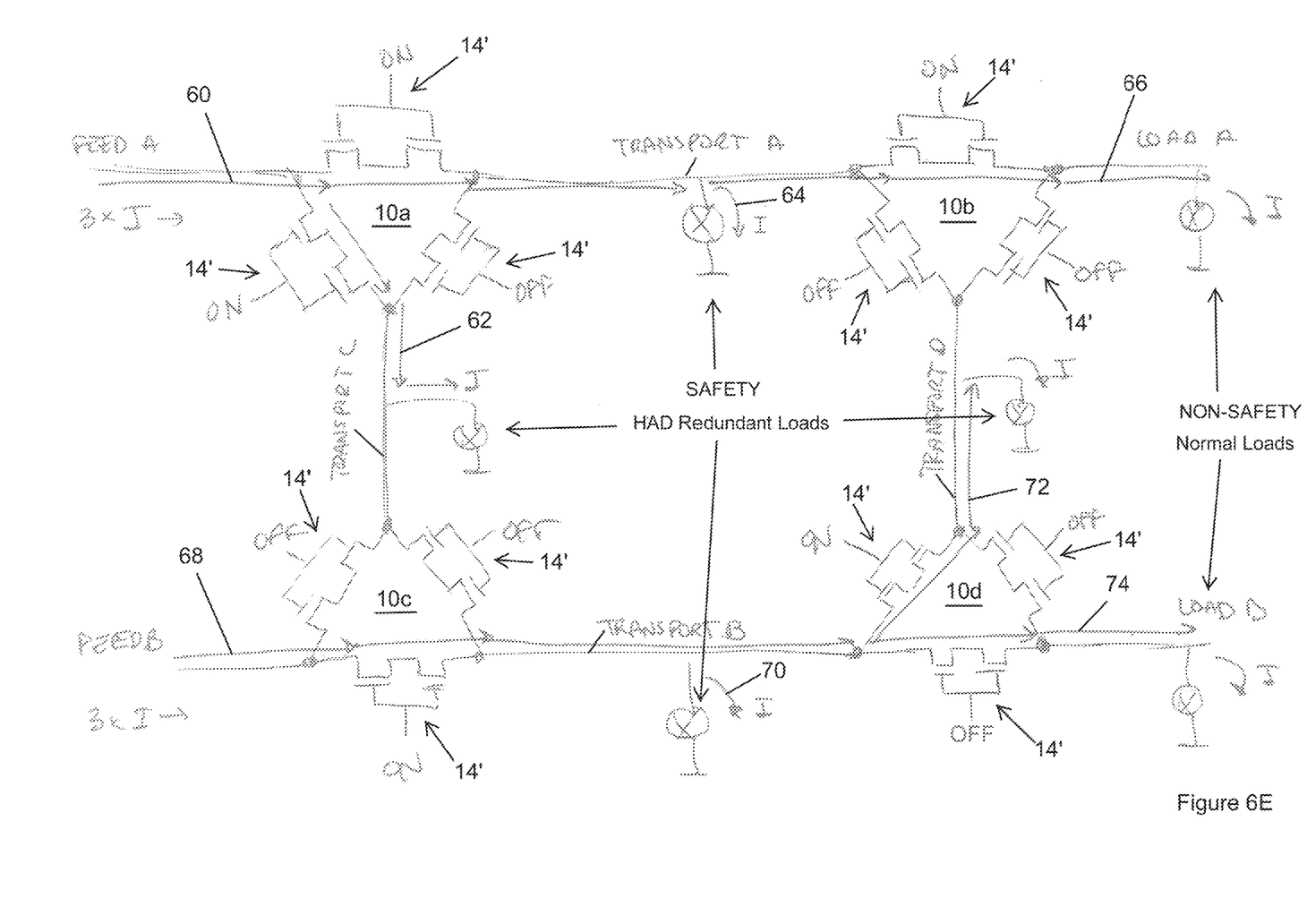

Referring next to FIG. 6E, a simplified electrical schematic is shown of another exemplary operation of an exemplary embodiment of a vehicle EDS with an exemplary embodiment of a switch arrangement for providing a plurality of alternative distribution paths in a system for distributing electrical power in a vehicle according to the present disclosure. In that regard, FIG. 6E depicts the scenario of full power supply to loads in all transport lines in the vehicle EDS (i.e., energy transfer and draining). In this example, lines TRANSPORT A, TRANSPORT B, TRANSPORT C, and TRANSPORT D have loads connected thereto which may be considered "SAFETY" loads relevant for autonomous driving (i.e., HAD Redundant Loads), while LOAD A and LOAD B may be considered "NON-SAFETY" Normal loads (i.e., non-HAD loads).

As seen therein, FEED A supplies a current 60 (e.g., 3×I) to switch arrangement 10a. The switches 14' of switch arrangements 10a and 10b are controlled, adapted, configured, or reconfigured to ON or OFF states as shown to establish paths for current 62 (e.g., I) to the SAFETY load connected to TRANSPORT C, current 64 (e.g., I) to the SAFETY load connected to TRANSPORT A, and current 66 (e.g., I) to LOAD A. Similarly, FEED B supplies a current 68 (e.g., 3×I) to switch arrangement 10c. The switches 14' of switch arrangements 10c and 10d are controlled, adapted, configured, or reconfigured to ON or OFF states as shown to establish paths for current 70 (e.g., I) to the SAFETY load connected to TRANSPORT B, current 72 (e.g., I) to the SAFETY load connected to TRANSPORT D, and current 74 (e.g., I) to LOAD B.

Figure 6F:
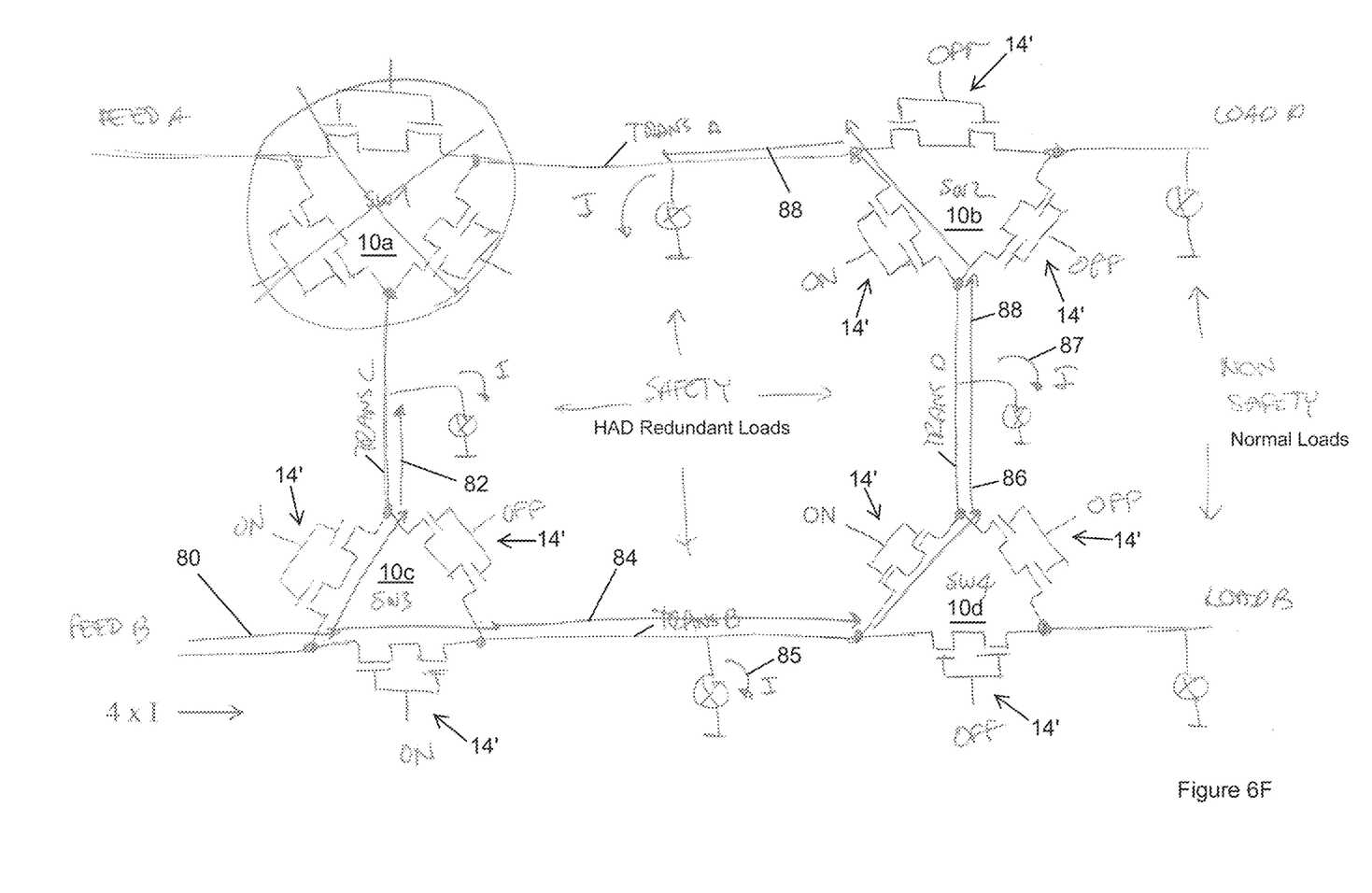

FIG. 6F is a simplified electrical schematic of another exemplary operation of an exemplary embodiment of a vehicle EDS with an exemplary embodiment of a switch arrangement for providing a plurality of alternative distribution paths in a system for distributing electrical power in a vehicle according to the present disclosure. In that regard, FIG. 6F depicts a failure of a complete switch arrangement, in this case switch arrangement 10a. Even with the complete failure of switch arrangement 10a such that FEED A is unable to supply power to any vehicle loads (or similarly a failure of the source FEED A), it is still possible to supply power to the four SAFETY loads connected to TRANSPORT A, TRANSPORT B, TRANSPORT C, and TRANSPORT D. In that regard, the NON-SAFETY loads, LOAD A and LOAD B, will also be disconnected so as not to demand excessive energy from source FEED B, thereby protecting the SAFETY loads and/or their functions by ensuring an adequate current or power supply thereto.

With reference to FIG. 6E, during normal operations, the source FEED B may supply a current 68 of, e.g., 3×I, to switch arrangement 10c. However, the failure of the switch arrangement 10a as shown in FIG. 6F represents an abnormal condition during which the source FEED B may supply a current 80 of, e.g., 4×I, to switch arrangement 10c.

The switches 14' of switch arrangement 10c are controlled, adapted, configured, or reconfigured to ON or OFF states as shown to establish a path for a current 82 (e.g., I) to TRANSPORT C and the SAFETY load connected to TRANSPORT C, as well as a path for a current 84 (e.g., 3×I) to TRANSPORT B, including a current 85 (e.g., I) to the SAFETY load connected to TRANSPORT B. The switches 14' of switch arrangement 10d are controlled, adapted, configured, or reconfigured to ON or OFF states as shown to establish a path for the current 86 (e.g., 2×I) to TRANSPORT D, including a current 87 (e.g., I) the SAFETY load connected to TRANSPORT D, as well as a path for a current 88 (e.g., I) to the switch arrangement 10b. The switches 14' of the switch arrangement 10b are controlled, adapted, configured, or reconfigured to ON or OFF states as shown to establish a path for the current 88 (e.g., I) to the SAFETY load connected to TRANSPORT A. Moreover, the switches 14' of the switch arrangements 10b and 10d are also controlled, adapted, configured, or reconfigured as shown to isolate the NON-SAFETY Normal Loads, LOAD A and LOAD B. It should be noted that a less dramatic failure than that of a complete switch arrangement (10a as shown in FIG. 6F), e.g., the failure of only one of the three branches or switches 14' in a delta-switch arrangement 10a, 10b, 10c, 10d, would be addressed by enabling the redundant branches or switches 14' in that respective switch arrangement 10a, 10b, 10c, 10d.

The switch arrangements 10a, 10b, 10c, 10d may also have individual branches or switches 14, 14' controlled using an algorithm that may selectively activate two branches or switches 14, 14' at each delta-switch arrangement 10a, 10b, 10c, 10d to establish alternative energy routing paths, and thereby increase the life of the switches and that of the overall system. Such an algorithm may also consider environmental conditions (e.g., temperature, humidity) as well as system parameters (e.g., currents, voltages) in such control.

It should be noted that the electrical power supplies or sources (e.g., Supply A, Supply B, Supply C, BATT A, BATT B, FEED A, FEED B), the electrical loads (e.g., Normal ECU, DOOR ZONE loads, GLOVEBOX load, REAR LIGHT load, TRUNK load, NON-SAFETY Normal Loads, HAD Redundant ECU, TCU, SAFETY HAD Redundant Loads), and/or the transport lines (e.g., TRANSPORT A, B, C, D) may each be referred to as an electrical element. As well, the switch arrangements (e.g., 10, 10a, 10b, 10c, 10d) may each comprise or be referred to as a communication node.

As previously described, each of the switches 14, 14' may be selectively operated to establish at least one of a plurality of distribution paths as described herein based on a status of a transport line, an electrical power supply, an electrical load, a switch arrangement 10, 10a, 10b, 10c, 10d, a switch 14, 14', or a status of a value of at least one current or current flow in the electrical distribution system. Such a status may comprise, for example, a short circuit in a transport line or an electrical load. Such a status may also comprise, for example, a failure of a power supply, a switch arrangement 10, 10a, 10b, 10c, 10d, or a switch 14, 14', or a history of usage of a switch 14, 14' in a switch arrangement 10, 10a, 10b, 10c. In that regard, while usage history is not directly measurable (i.e., reading a component status), a calculation reflecting usage history may be based on environment temperatures, flowed current, and/or time duration in an activation mode. Such a status may thus comprise historical data such as aging estimations and thus enable respective switching to equalize aging.

It should also be noted that an alternative mode of the present disclosure may comprise the energy of two of the power supplies needed at the same time. For example, a load may have a high-level current demand, outside of its normal use. In that regard, after a crash, and an amount of time lapsed, a high-level current demand may be needed to ensure enough supply to a safety communication device. Such alternative modes may be referred to as "dual-supply required" modes or similar.

As is readily apparent from the foregoing, various non-limiting embodiments of a switch arrangement and method for controlling a switch arrangement for providing a plurality of alternative distribution paths in a system for distributing electrical power in a vehicle have been described. The switch arrangement and method for controlling a switch arrangement as described herein provide an improved electrical distribution system architecture having further redundancy to prevent open supply paths without unduly increasing costs.

While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A switch arrangement for providing a plurality of alternative distribution paths in a system for distributing electrical power in a vehicle including a plurality of electrical power supplies and a plurality of electrical loads, the switch arrangement comprising:
   a first switch configured to be connected to a first electrical element, the first switch having an open state or a closed state;
   a second switch configured to be connected to the first electrical element and a second electrical element, the second switch having an open state or a closed state; and
   a third switch configured to be connected to the second electrical element and a third electrical element, the third switch having an open state or a closed state;
   wherein each of the first, second, and third switches is independently controllable and selectively operable, based on detection of both a first anomaly and a value of at least one current flowing in the system for distributing electrical power in the vehicle, to interconnect at least two of the first, second, and third electrical elements to establish a first one of the plurality of alternative distribution paths to connect one of the plurality of electrical power supplies and one of the plurality of electrical loads; and
   wherein each of the first, second, and third switches is independently controllable and selectively operable, based on detection of a second anomaly in the system for distributing electrical power in the vehicle, to interconnect at least two of the first, second, and third electrical elements to establish a second one of the plurality of alternative distribution paths to connect two of the plurality of electrical power supplies, wherein a first one of the two of the plurality of electrical power supplies is chargeable by a second one of the two of the plurality of electrical power supplies.

2. The switch arrangement of claim 1 wherein the first, second, and third switches are configured to be connected in a delta configuration.

3. The switch arrangement of claim 1 wherein each of the first, second, and third electrical elements comprises a transport line, one of the plurality of electrical power supplies, or one of the plurality of electrical loads.

4. The switch arrangement of claim 1 wherein each of the first, second, and third switches comprises a bi-directional switch.

5. The switch arrangement of claim 1 wherein each of the first, second, and third switches comprises a pair of switches connected in series.

6. The switch arrangement of claim 1 wherein each of the first, second, and third switches comprises a relay, a bi-stable relay, or a transistor.

7. The switch arrangement of claim 1 wherein the vehicle comprises an autonomous vehicle and the plurality of electrical loads comprises at least one redundant highly autonomous driving (HAD) load.

8. The switch arrangement of claim 7 wherein the plurality of electrical loads further comprises a non-HAD load.

9. The switch arrangement of claim 1 wherein each of the first, second, and third switches is selectively operated to establish at least one of the plurality of alternative distribution paths based on a status of:
one of the first, second, or third electrical elements;
one of the first, second, or third switches; or
another switch arrangement for providing the plurality of alternative distribution paths in the system for distributing electrical power in the vehicle.

10. The switch arrangement of claim 1 further comprising a controller configured to control operation of the first, second, and third switches.

11. The switch arrangement of claim 10 wherein the controller is further configured to receive and transmit signals indicative of a state each of the first, second, and third switches.

12. The switch arrangement of claim 10 wherein the controller is further configured to receive and transmit signals indicative of a status of:
at least one of the first, second, or third electrical elements
at least one of the first, second, or third switches; or
a value of at least one current flow in the system for distributing electrical power in the vehicle.

13. An energy distribution management system for a vehicle, the system comprising:
a plurality of communication nodes each comprising the switch arrangement of claim 1; and
a controller configured to control operation of the first, second, and third switches of each switch arrangement of each communication node.

14. A method for controlling a switch arrangement for providing a plurality of alternative distribution paths in a system for distributing electrical power in a vehicle including a plurality of electrical power supplies and a plurality of electrical loads, a first switch connected to a first electrical element, the first switch having an open state or a closed state, a second switch connected to the first electrical element and a second electrical element, the second switch having an open state or a closed state, and a third switch connected to the second electrical element and a third electrical element, the third switch having an open state or a closed state, wherein each of the first, second, and third switches is independently controllable, the method comprising:
selectively operating each of the first, second, and third switches to its open or closed state, based on detection of both a first anomaly and a value of at least one current flowing in the system for distributing electrical power in the vehicle, to interconnect at least two of the first, second, and third electrical elements to establish a first one of the plurality of alternative distribution paths to connect one of the plurality of electrical power supplies and one of the plurality of electrical loads; and
selectively operating each of the first, second, and third switches to its open or closed state, based on detection of a second anomaly in the system for distributing electrical power in the vehicle, to interconnect at least two of the first, second, and third electrical elements to establish a second one of the plurality of alternative distribution paths to connect to connect two of the plurality of electrical power supplies, wherein a first one of the two of the plurality of electrical power supplies is chargeable by a second one of the two of the plurality of electrical power supplies.

15. The method for controlling a switch arrangement of claim 14 wherein each of the first, second, and third electrical elements comprises a transport line, one of the plurality of electrical power supplies, or one of the plurality of electrical loads.

16. The method for controlling a switch arrangement of claim 14 wherein the first, second, and third switches are connected in a delta configuration, and wherein each of the first, second, and third switches comprises a bi-directional switch.

17. The method for controlling a switch arrangement of claim 14 wherein the vehicle comprises an autonomous vehicle and the plurality of electrical loads comprises at least one redundant highly autonomous driving (HAD) load.

18. A non-transitory computer readable storage medium having stored computer executable instructions for controlling a switch arrangement for providing a plurality of alternative distribution paths in a system for distributing electrical power in a vehicle including a plurality of electrical power supplies and a plurality of electrical loads, the vehicle having a controller and a first switch connected to a first electrical element, the first switch having an open state or a closed state, a second switch connected to the first electrical element and a second electrical element, the second switch having an open state or a closed state, and a third switch connected to the second electrical element and a third electrical element, the third switch having an open state or a closed state, wherein each of the first, second, and third switches is independently controllable, the computer executable instructions configured to cause the controller to:
selectively operate each of the first, second, and third switches to its open or closed state, based on detection of both a first anomaly and a value of at least one current flowing in the system for distributing electrical power in the vehicle, to interconnect at least two of the first, second, and third electrical elements to establish a first one of the plurality of alternative distribution paths to connect one of the plurality of electrical power supplies and one of the plurality of electrical loads; and
selectively operate each of the first, second, and third switches to its open or closed state, based on detection of a second anomaly in the system for distributing electrical power in the vehicle, to interconnect at least two of the first, second, and third electrical elements to establish a second one of the plurality of alternative distribution paths to connect to connect two of the plurality of electrical power supplies, wherein a first one of the two of the plurality of electrical power supplies is chargeable by a second one of the two of the plurality of electrical power supplies.

19. The computer readable storage medium of claim 18 for controlling a switch arrangement wherein the first, second, and third switches are connected in a delta configuration, wherein each of the first, second, and third switches comprises a bi-directional switch, and wherein each of the first, second, and third electrical elements comprises a transport line, one of the plurality of electrical power supplies, or one of the plurality of electrical loads.

20. The computer readable storage medium of claim 18 for controlling a switch arrangement wherein the vehicle comprises an autonomous vehicle, and wherein the plurality of electrical loads comprises at least one redundant highly autonomous driving (HAD) load.

* * * * *

UNITED STATES PATENT AND TRADEMARK OFFICE
CERTIFICATE OF CORRECTION

PATENT NO. : 11,529,917 B2
APPLICATION NO. : 16/862141
DATED : December 20, 2022
INVENTOR(S) : Marc Miro Bargallo et al.

It is certified that error appears in the above-identified patent and that said Letters Patent is hereby corrected as shown below:

In the Claims

Column 11, Lines 59-60, Claim 14:
After "alternative distribution paths to connect"
Delete "to connect" (second occurrence).

Column 12, Lines 45-46, Claim 18:
After "alternative distribution paths to connect"
Delete "to connect" (second occurrence).

Signed and Sealed this
Fifth Day of March, 2024

Katherine Kelly Vidal
*Director of the United States Patent and Trademark Office*